(12) United States Patent
Barton et al.

(10) Patent No.: US 7,605,487 B2
(45) Date of Patent: Oct. 20, 2009

(54) METHOD FOR OPERATING A FREQUENCY CONVERTER OF A GENERATOR AND WIND ENERGY TURBINE HAVING A GENERATOR OPERATED ACCORDING TO THE METHOD

(75) Inventors: Werner Barton, Gescher (DE); Andreas Buecker, Hasbergen (DE)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 10/598,773

(22) PCT Filed: Mar. 12, 2004

(86) PCT No.: PCT/EP2004/002588

§ 371 (c)(1),
(2), (4) Date: Oct. 30, 2006

(87) PCT Pub. No.: WO2005/099063

PCT Pub. Date: Oct. 20, 2005

(65) Prior Publication Data

US 2007/0273155 A1 Nov. 29, 2007

(51) Int. Cl.
*H02P 9/04* (2006.01)
(52) U.S. Cl. .................. 290/44; 290/28; 290/55
(58) Field of Classification Search ............ 290/28, 290/44, 55
See application file for complete search history.

(56) References Cited

U.S. PATENT DOCUMENTS

| | | | | |
|---|---|---|---|---|
| 5,225,712 | A | 7/1993 | Erdman | |
| 5,798,631 | A * | 8/1998 | Spee et al. | 322/25 |
| 6,134,124 | A | 10/2000 | Jungreis et al. | |
| 6,281,595 | B1 * | 8/2001 | Sinha et al. | 290/40 A |
| 6,784,634 | B2 * | 8/2004 | Sweo | 318/727 |

FOREIGN PATENT DOCUMENTS

| | | |
|---|---|---|
| FR | 2823381 A | 10/2002 |
| WO | WO 02/103879 | 12/2002 |

OTHER PUBLICATIONS

Hoffmann W: "Optimal reactive power splitting in wind power plants controlled by double-fed induction generator" Africon, 1999 IEEE Cape Town, South Africa Sep. 28-Oct. 1, 1999, Piscataway, NJ, USA, IEEE, US.

* cited by examiner

*Primary Examiner*—Nicholas Ponomarenko
*Assistant Examiner*—Iraj A Mohandesi
(74) *Attorney, Agent, or Firm*—Global Patent Operation

(57) ABSTRACT

The method for operating a frequency converter (26) of a generator (14) in particular of a wind energy turbine (10), in the event of a substantial grid voltage drop, wherein the frequency converter (26) comprises a generator-side power converter (32), to be connected to the generator (14), a grid-side power converter (28) to be connected to the voltage grid (18), and a DC link circuit (30) for connecting the generator-side power converter (32) to the grid-side power converter (28), comprises the step of generating the amount of reactive current to be supplied to the grid (18) by controlling the frequency converter (26).

24 Claims, 3 Drawing Sheets

METHOD FOR OPERATING A FREQUENCY CONVERTER OF A GENERATOR AND WIND ENERGY TURBINE HAVING A GENERATOR OPERATED ACCORDING TO THE METHOD

BACKGROUND OF THE INVENTION

1. Field of the Invention

The present invention relates to a method for operating a frequency converter of a generator and, in particular, of a generator of a wind energy turbine, in the event of a substantial grid voltage drop. Moreover, the present invention also comprises a wind energy turbine having a generator operated accordingly. Finally, the present invention also provides for the operation of a generator under normal grid conditions with the generator not being in its operating state for supplying power to the grid, and a wind energy turbine having a generator operated accordingly.

2. Related Prior Art

Electrical power in public power grids is supplied by diverse energy sources converting mechanical energy into electrical energy. The main energy sources supporting public power grids are coal power plants and nuclear power plants. Several other types of energy sources, in particular power plants of regenerative energy like solar power plants, water power plants or wind energy turbines, also contribute to support the public power grid.

In the past, in the event of a significant grid voltage drop in a public power grid, it was required that in such an event wind energy turbines are shut down automatically. However, due to the increased number of wind energy turbines it becomes more and more important that these turbines support the public power grid in the event of a substantial grid voltage drop.

In power generators like those used for wind energy turbines, it is known to couple the rotor windings of the generator via a frequency converter to the grid. In the frequency converter the frequency of the power generated by the generator is converted to the frequency of the grid.

In order to support a public power grid, not only real power but also reactive power has to be supplied. Both the real and the reactive power has to be controlled by the frequency converter in the event of normal grid conditions. Methods for controlling the reactive power under normal grid conditions are described e.g. in DE-A-100 20 635, WO-A-01/20745, WO-A-02/086314, WO-A-02/086315, and EP-A-1 222 389.

From the utility it is more and more required to provide support of the grid by supplying reactive current in the event of a substantial grid voltage drop or under normal grid conditions but with the stator windings of the generator being disconnected from the grid.

SUMMARY OF THE INVENTION

The present invention provides a method for operating a frequency converter of a generator in particular of a wind energy turbine, in the event of a substantial grid voltage drop, wherein the frequency converter comprises a generator-side power converter, to be connected to the generator, a grid-side power converter to be connected to the voltage grid, and a DC link circuit for connecting the generator-side power converter to the grid-side power converter, the method comprising the step of controlling the amount of reactive current to be supplied to the grid by controlling the frequency converter so as to generate reactive current also in the event of a grid voltage drop.

According to a first aspect of the invention, in the event of a substantial grid voltage drop, the amount of reactive current to be supplied to the grid is controlled by controlling the frequency converter accordingly so as to generate reactive current. Depending on the type of generator used, either the generator-side power converter or the grid-side power converter or both power converters of the frequency converter is/are controlled. The generator-side power converter of a frequency converter often is referred to as a AC/DC converter or rectifier, while the grid-side power converter is referred to as a DC/AC converter or inverter. In a frequency converter, the generator-side and grid-side power converters are connected by a DC link circuit comprising at least one capacitor.

If a double fed or dual-powered asynchronous generator is used, in the event of a substantial grid voltage drop, according to the invention at least one of the generator-side power converter and the grid-side power converter is controlled so as to generate reactive current necessary to support the grid. A double fed asynchronous machine is an induction generator having its stator and rotor windings driven by the grid. In case of disconnection of the stator windings from the grid, according to the invention the reactive current can still be controlled in the event of a substantial grid voltage drop, in that the grid-side power converter is controlled. In case of the generator being an asynchronous or synchronous machine, controlling the amount of reactive current to be supplied to the grid is performed by controlling the grid-side power converter so as to generate reactive current. If such a generator in the event of a substantial grid voltage drop is not in its operating state for generating power, i.e. the stator is disconnected from the grid, when e.g. the wind speed is less than the cut-in or a minimum wind speed or exceeds the cut-off of a maximum wind speed, the amount of reactive current to be supplied to the grid is generated by controlling the grid-side power converter.

Most preferably and typically, the reactive current in the frequency converter according to the invention is controlled by controlling the performance factor (cos $\phi$). However, also other control mechanisms for phase shifting which are basically known to those skilled in the art can be used in accordance with the invention.

Typically, the reactive current controlling step or at least one of the controlling steps is performed when, for a certain time period e.g. between a few milliseconds and a few seconds, the grid voltage is decreased up to at least about 40%, more preferably 20%, and, in particular, up to at least 15% of its normal value, which in case of the medium high voltage grid is around 20 kV. According to a further aspect of the invention, after e.g. such a grid voltage drop the reactive current controlling step or at least one of the controlling steps is terminated when, for a few seconds, the grid voltage is increased again up to at least about 70%, more preferably 80 and, in particular, up to about 90% of its normal value.

According to another aspect of the invention, there is provided a method for operating a frequency converter of a generator in particular of a wind energy turbine under substantially normal grid condition (typically ±5-10% deviation from the normal grid voltage) and with the generator not being in its operating state, wherein the frequency converter comprises a generator-side power converter, to be connected to the generator, a grid-side power converter to be connected to the voltage grid, and a DC link circuit for connecting the generator-side power converter to the grid-side power converter, the method comprising the step of controlling the amount of reactive current to be supplied to the grid by controlling the grid-side power converter.

In accordance with this aspect of the invention, the amount of reactive current to be supplied to the grid, is controlled by controlling the grid-side power converter, when under normal grid conditions, the generator is not in its operating state, i.e. with its stator being disconnected from the grid as referred to before. The generator can be a asynchronous machine, a double fed asynchronous machine, or a synchronous machine. The control of the frequency converter can be supervised by the utility or a power management control of the generator or a group of generators at least one of which is operatively connected to the grid.

According to a further aspect, the present invention provides a wind energy turbine for generating power to be supplied to a grid, comprising
- a rotor,
- a generator operatively connected to the rotor,
- a frequency converter electrically connectable to the generator and the grid and comprising a generator-side power converter operatively connectable to the generator, a grid-side power converter operatively connectable to the grid, and a DC link circuit for connecting the generator-side power converter to the grid-side power converter, and
- a control unit for controlling the frequency converter for generating reactive current to be supplied to the grid, wherein in the event of a substantial grid voltage drop, the control unit controls the frequency converter for controlling the amount of reactive current to supplied to the grid so as to generate reactive current.

Finally, in a last aspect of the invention there is provided a wind energy turbine for generating power to be supplied to a grid, comprising
- a rotor,
- a generator operatively connected to the rotor,
- a frequency converter electrically connectable to the generator and the grid and comprising a generator-side power converter operatively connectable to the generator, a grid-side power converter operatively connectable to the grid, and a DC link circuit for connecting the generator-side power converter to the grid-side power converter, and
- a control unit for controlling the frequency converter for generating reactive current to be supplied to the grid, wherein under normal grid condition but with the generator not in its operating state, the control unit controlled the grid-side power converter of the frequency converter for controlling the amount of reactive current to be supplied to the grid.

BRIEF DESCRIPTION OF THE DRAWINGS

A full and enabling disclosure of the present invention, including the best mode thereof, to one of ordinary skill in the art, is set forth more particularly in the reminder of the specification, including reference to the accompanying drawings in which FIG. 1 schematically shows the circuitry of a frequency converter for controlling the amount of reactive power in the event of a substantial grid voltage drop with or without the generator being disconnected from the grid, or under normal grid conditions but with the generator being disconnected from the grid.

DESCRIPTION OF A PREFERRED EMBODIMENT OF THE INVENTION

Figure 1:
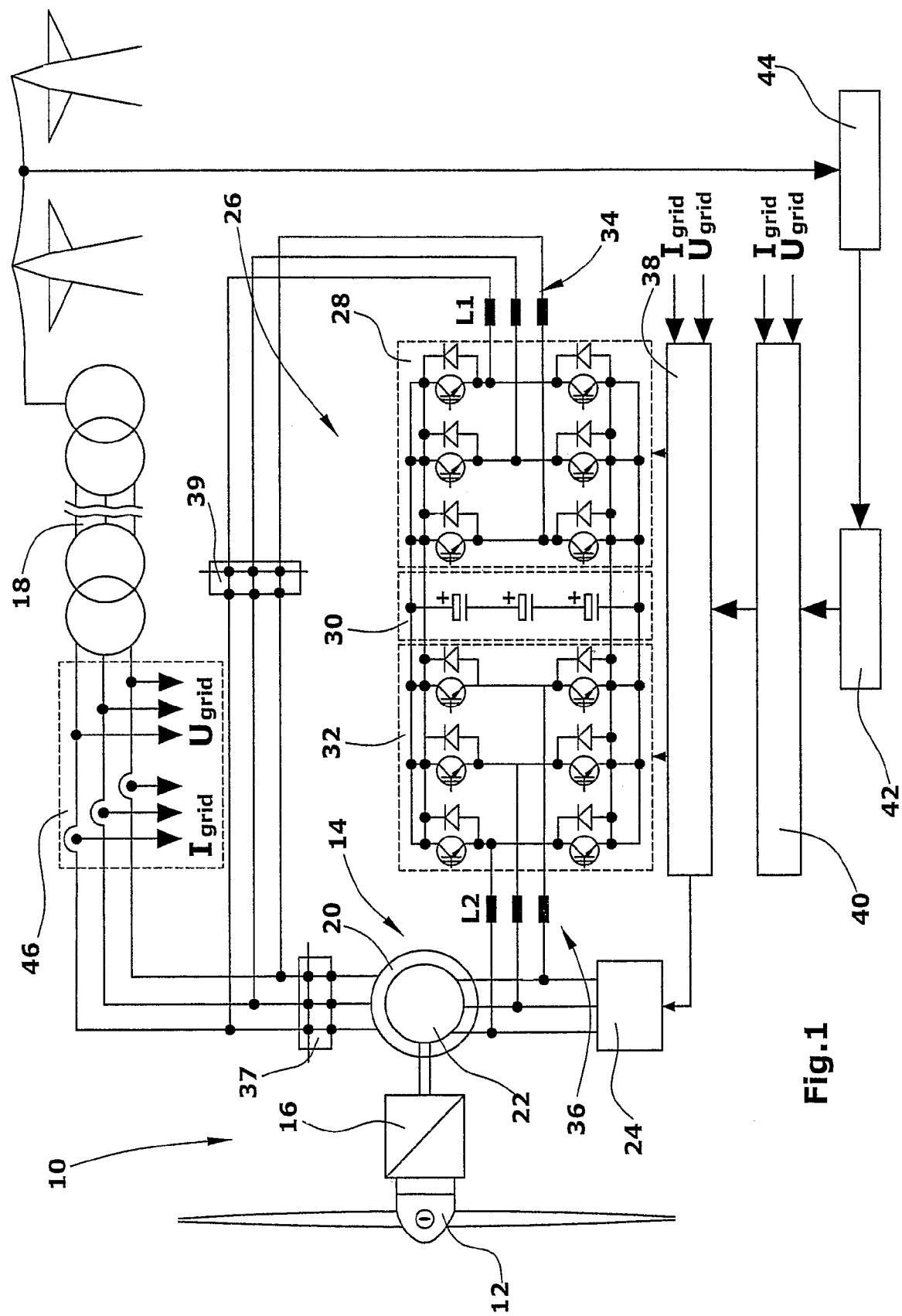

In FIG. 1, the primary components of a wind energy turbine 10 for converting mechanical energy into electrical energy are shown. According to the drawing, a rotor 12 of the wind energy turbine 10 is mechanically connected to an asynchronous generator 14 (i.e., induction generator), through a gearbox 16. The asynchronous generator converts rotational mechanical energy into electrical energy which is supplied to a power distribution grid 18. For doing so, the asynchronous generator typically includes a stator 20 having a three-phase winding (not shown) and connected to the power distribution grid 18. Moreover, the asynchronous generator 14 also includes a rotor 22 provided with a three-phase winding (not shown) which is connected to a short circuit 24 (also referred to as a crowbar).

As is commonly known, the rotor winding is excited by a frequency converter 26, which in turn is connected to the power distribution grid 18. The design of the frequency converter 26 is generally known to those skilled in the art. The frequency converter 26 includes a grid-side power converter 28 (DC/AC converter or inverter) connected to the power distribution grid 18, a DC link circuit 30, and a generator-side power converter 32 (AC/DC converter or rectifier) connected to the rotor winding. At the input and at the output of the frequency converter 26, filter circuits 34,36 are provided. Switches 37,39 are provided for connecting and disconnecting the stator and rotor to and from the grid, respectively.

The frequency converter 26 is controlled by a control unit 38, which receives nominal rating parameters (e.g. operational conditions) from the wind energy turbine (not shown), as well as grid voltage $U_{grid}$ and grid current $I_{grid}$. These input parameters received by the control unit 38 are generally known to those skilled in the art with respect to variable speed wind energy turbines.

Although in FIG. 1 specific electronic switches are shown as part of the grid-side and generator-side power converters 28,32, respectively, any type of self-communicating or externally controlled commutating electronic element like a thyristor, transistor, IGBT, diode or the like can be used. Moreover, although in FIG. 1 the generator 14 is shown as build as a double fed asynchronous machine, other types of generators like asynchronous or synchronous machine (the latter being electrically or permanently excited) can be used in accordance with the invention for controlling reactive current in case of a substantial grid voltage drop and/or in case of the generator not being in its operating state due to a temporarily disconnection from the grid 18.

As shown in FIG. 1, control of the control unit 38 is supervised by a turbine controller 40 which, in this embodiment, is controlled by a wind park energy management 42 controlling a plurality of (not shown) turbine controllers 40 and controlled by the utility 44. In the event that the wind energy turbine 10 is not part of a wind energy park comprising a plurality of wind energy turbines, the utility 44 directly controls the turbine controller 40.

Presently, grids are stabilized by conventional power plants. Upon occurrence of a brief short circuit or disturbance, e.g. an undesired disconnection within the grid, the grid voltage undergoes a brief drop, and after the disturbance has been terminated, the power plants generally increase the voltage again. Presently, more nominal power output of wind energy plants is provided and the number of the wind energy plants is rapidly increasing. Thus, today's large wind parks reach the power output of small conventional power plants. To achieve grid stability, future wind energy plants must have the same properties as conventional power plants in the event of disturbances of the grid. In the event of a grid voltage drop not only real power has to be generated for supporting the grid 18 but also reactive current or power has to be generated in order to support the disturbed grid which due to its impedances and, in particular, due to the inductors represented by the wiring of the grid needs some reactive power.

According to the invention, in the event that a detector 46 for the grid voltage and/or the grid current senses a grid distortion (i.e. a substantial grid voltage drop), via the turbine controller 40 and/or the control unit 38 the frequency converter 26 is controlled so as to provide the amount of reactive current necessary to support the disturbed grid. The reactive current can be generated and controlled by at least one of the grid-side power converter 28 and the generator-side power converter 32. If switch 37 is open, i.e. if the generator 14 is not in its operating state, and if the grid 18 is disturbed, reactive current can be generated by controlling the grid-side power converter 28 only. For controlling the reactive current under the circumstances mentioned above, for example the performance factor of the power converters 28,32 of the frequency converter 26 can be controlled.

Moreover, by the circuitry and system shown in FIG. 1, also under normal grid conditions and with the generator 14 being disconnected from the grid 18 (switch 37 opened), reactive current can be generated to be supplied to the grid 18. In the instant embodiment this can be performed by controlling the grid-side power converter 28.

As being evident from the above, in one aspect of the invention, through the frequency converter 26 reactive power can be supplied to the grid 18 for supporting the same. The amount of reactive power supply will be increased. This causes an increased voltage supply from the wind energy turbine 10 which is desirable in case of a grid voltage drop. According to the invention, reactive power is supplied by operating the frequency converter 26, i.e. by operating at least one of its power converters 28 and 32. Both converters can create reactive power which can be controlled by the control unit 38 and/or the turbine controller 40.

One possibility for controlling the amount of reactive power generated by the wind energy turbine 10 and supplied to the grid 18 is to measure the grid voltage in order to influence the control unit 38 in such a way that the generator 14 will be over excited. This causes the generator 14 to supply reactive power. This possibility is applicable for double fed asynchronous machines by controlling the generator-side power converter 32 of the frequency converter 26. As an alternative or in addition thereto, reactive power can be generated also by controlling the grid-side power converter 28. In this case, the grid-side power converter 28 delivers reactive power to the grid 18. Even if the stator of the generator 14 is not connected to the grid 18, the grid-side power converter 28 is able to deliver reactive power in both the over or under excited operating mode of the generator 14.

A further aspect of the invention is related to reactive power control in normal grid conditions. In this case the grid-side power converter 28 is able to deliver reactive power in both the over or under excited operating mode of the generator 14 when the stator of the generator 14 is not connected to the grid 18 and when the wind energy turbine 10 delivers not real power.

For all the above-mentioned aspects, the reference of reactive power can be calculated inside the converter control unit 38 or inside the turbine controller 40. Also it is possible to calculate the reference of reactive power by another unit, for example the wind park energy management 42. This may also comprise the option of external units calculating the reference of reactive power, i.e. for example the utility 44.

Figure 2:
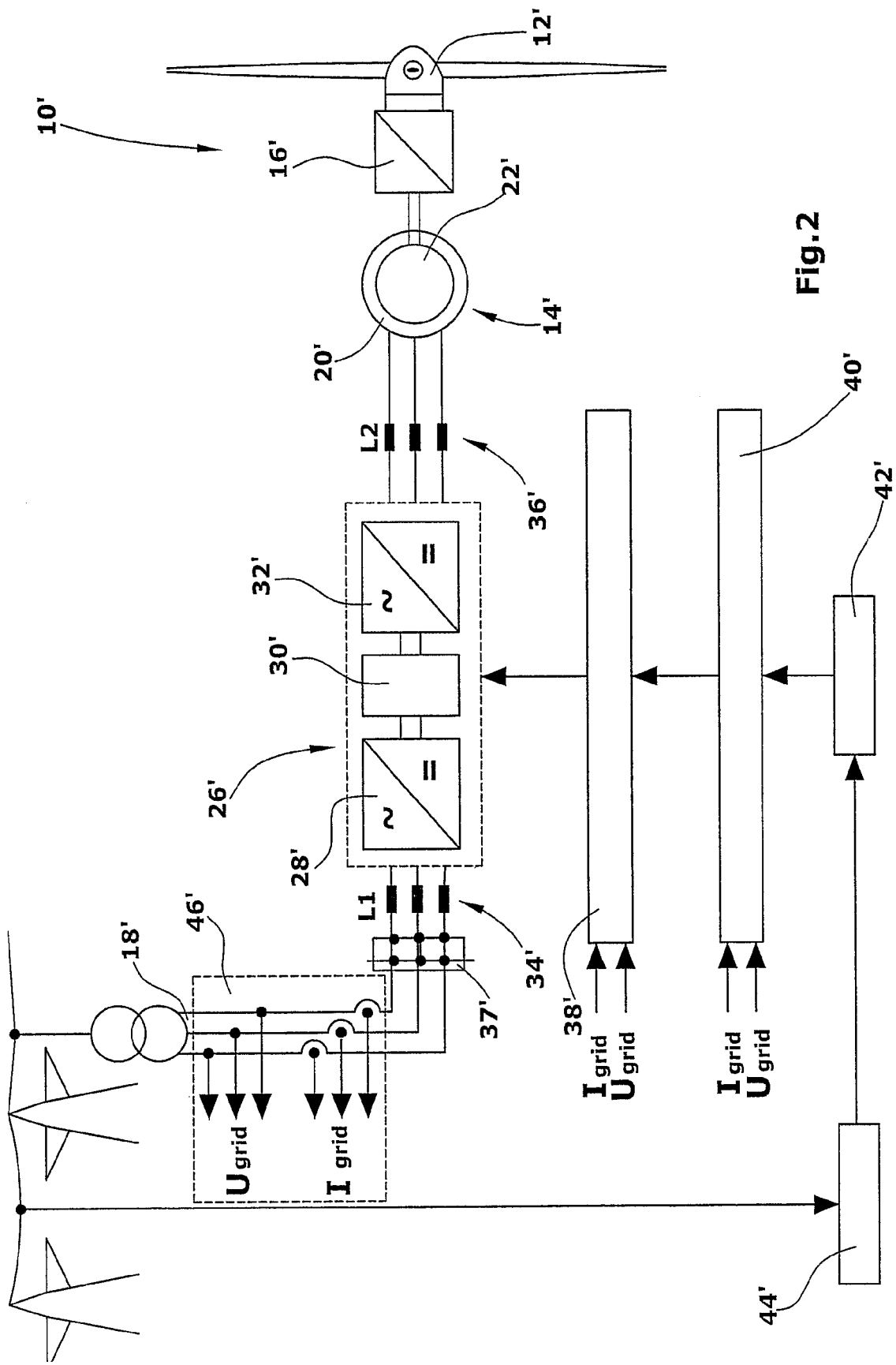
FIG. 2 shows an embodiment of the invention similar to that of FIG. 1 with the asynchronous generator being replaced by a permanently excited synchronous generator.
Figure 3:
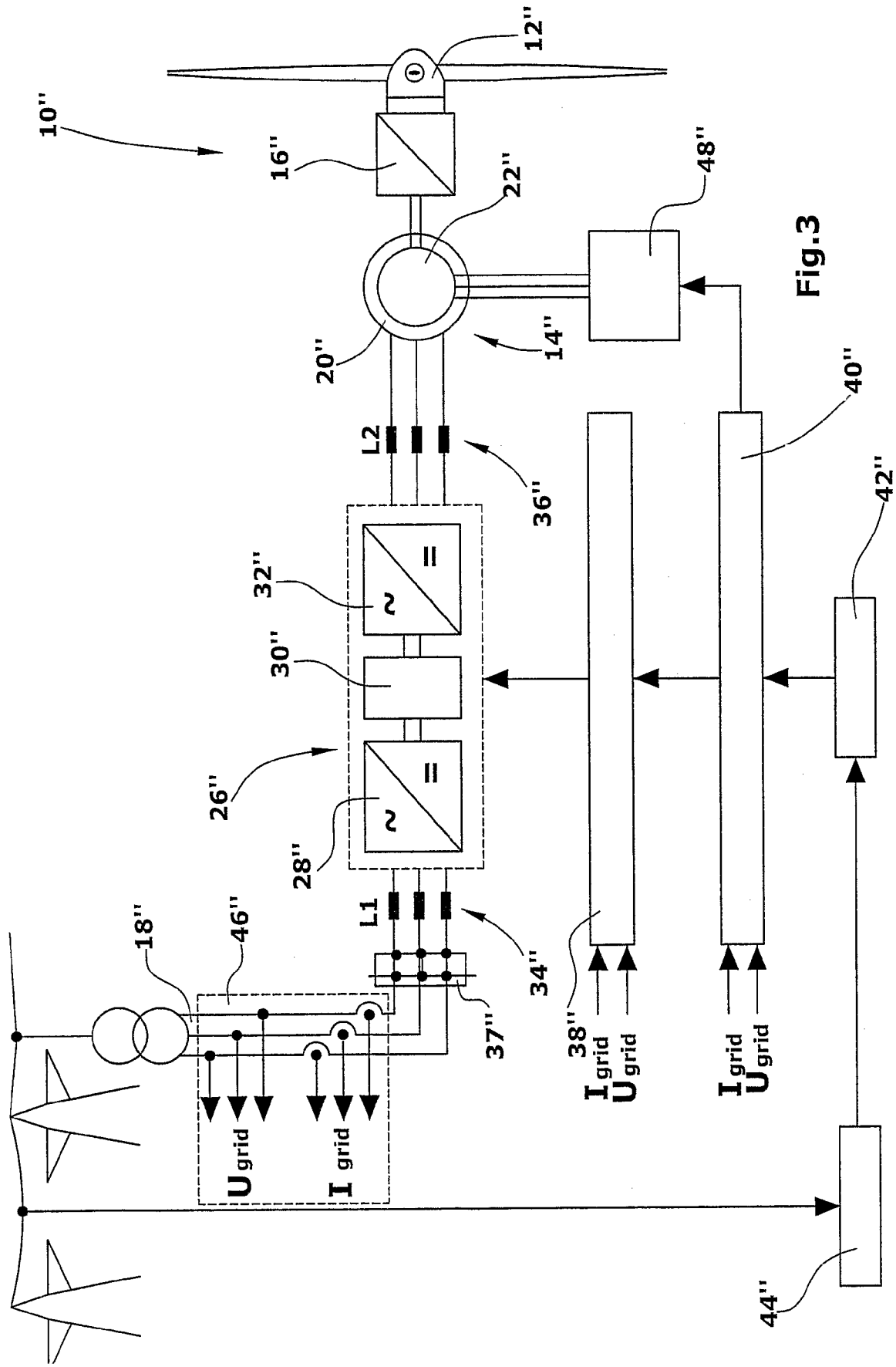
FIG. 3 shows an embodiment of the invention similar to that of FIG. 2 with the permanently excited synchronous generator being replaced by an electrically excited synchronous generator.

Further embodiments of the invention are shown in FIG. 2 and FIG. 3. In these Figures for parts similar or identical to the parts of FIG. 1, the same reference numerals provided with a prime or double prime are used.

The distinguishing feature of the wind energy turbine 10' according to FIG. 2 over that of FIG. 1 relates to the type of generator 14' used. However, the control of the generation of reactive current in the frequency converter 26' basically is the same. This is also true for the embodiment of FIG. 3 in which the synchronous generator 14' of the embodiment of FIG. 2 is replaced by a electrically excited synchronous generator 14" driven by an exciting circuitry 48" controlled by the turbine controller 40" depending beside others from the rotational speed of the rotor 12".

More specifically, in the embodiments of FIG. 2 and FIG. 3, reactive current in the event of a grid voltage drop is generated by controlling the grid-side power converter 28 of the frequency converter 26.

In connection with the embodiment of FIG. 1 also the case is taken into consideration that the grid 18 is under substantially normal condition and that the generator 14 is disconnected from the grid by means of the switch 37 which is opened. In a synchronous generator 14' and 14" as shown in FIG. 2 and FIG. 3, disconnection of the generator from the grid is performed by leaving open the electronic switches of the generator-side power converter 32. In this situation the grid-side power converter 28 is still connected to the grid 18 since the switch 37' and 37", respectively, is still closed. Accordingly, reactive current can be generated by controlling the grid-side power converter 28 so as to supply reactive current to the grid 18.

Although the invention has been described and explained with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. Method for operating a frequency converter (26,26',26") of a generator (14,14',14"), in the event of a substantial grid voltage drop in a grid, wherein the frequency converter (26, 26',26") comprises a generator-side power converter (32,32', 32"), to be connected to the generator (14,14',14"), a grid-side power converter (28,28',28") to be connected to the grid (18, 18',18"), and a DC link circuit (30,30',30") for connecting the generator-side power converter (32,32',32") to the grid-side power converter (28,28',28"), the method comprising the step of generating an amount of reactive current to be supplied to the grid (18,18',18") by controlling the frequency converter (26,26',26") so as to generate reactive current.

2. Method according to claim 1, wherein the generator (14) is a double fed asynchronous machine and wherein generating the amount of reactive current to be supplied to the grid (18) is performed by controlling at least one of the generator-side power converter (32) and the grid-side power converter (28).

3. Method according to claim 2, wherein, if the generator (141 is not in its operating state for generating power, the reactive current to be supplied to the grid (18) is generated by controlling the grid-side power converter (28).

4. Method according to claim 1, wherein the generator (14',14") is an asynchronous machine and wherein generating the amount of reactive current to be supplied to the grid (18,18',18") is performed by controlling the grid-side power converter (28,28',28").

5. Method according to claim 1, wherein the generator (14',14") is a synchronous machine and wherein generating the amount of reactive current to be supplied to the grid (18',18") is performed by controlling the grid-side power converter (28',28").

6. Method according to claim 4, wherein, if the generator (14',14") is not in its operating state for generating power, the reactive current to be supplied to the grid (18',18") is generated by controlling the grid-side power converter (28',28").

7. Method according to claim 1, wherein for generating reactive current through the frequency converter (26,26',26") the performance factor is controlled.

8. Method according to claim 1, wherein the step is performed when, for period of time of a few milliseconds up to a few seconds, the grid voltage is decreased to at least about 40% of its normal value.

9. Method according to claim 1, wherein the step is terminated when, after a grid voltage drop, for a few seconds the grid voltage is increased to at least about 70% of its normal value.

10. Method for operating a frequency converter (26,26',26") of a generator (14,14',14") under substantially normal grid condition and with the generator (14,14',14") not being in its operating state, wherein the frequency converter (26,26',26") comprises a generator-side power converter (32,32',32"), to be connected to the generator (14,14',14"), a grid-side power converter (28,28',28") to be connected to the voltage grid (18,18',18"), and a DC link circuit (30,30',30") for connecting the generator-side power converter (32,32',32") to the grid-side power converter (28,28',28"), the method comprising the step of
controlling an amount of reactive current to be supplied to the grid (18,18',18") by controlling the grid-side power converter (28,28',28").

11. Method according to claim 10, wherein the generator (14,14',14") is an asynchronous machine, a double fed asynchronous machine, or a synchronous machine.

12. Method according to claim 10, wherein for controlling reactive current through the frequency converter (26,26',26"), the performance factor of the grid-side power converter (28, 28',28") is controlled.

13. Method according to claim 1, wherein the control of the frequency converter (26,26',26") is supervised by a utility (44,44',44") or a power management control (40,40',40",42, 42',42") of the generator (14,14',14") or of a group of generators (14,14',14") at least one of which is operatively connected to the grid (18,18',18").

14. Wind energy turbine (10,10',10") for generating power to be supplied to a grid (18,18',18"), comprising
a rotor (12,12'12"),
a generator (14,14',14") operatively connected to the rotor (12,12',12"),
a frequency converter (26,26',26") electrically connectable to the generator (14,14',14") and the grid (18,18',18") and comprising a generator-side power converter (32, 32',32") operatively connectable to the generator (14, 14',14"), a grid-side power converter (28,28',28") operatively connectable to the grid (18,18',18"), and a DC link circuit (30,30',30") for connecting the generator-side power converter (32,32',32") to the grid-side power converter (28,28',28"), and
a control unit (38,38',38") for controlling the frequency converter (26,26',26") for generating reactive current to be supplied to the grid,
wherein in the event of a substantial grid voltage drop, the control unit (38,38',38") controls the frequency converter (26,26',26") for generating an amount of reactive current to be supplied to the grid (18,18',18").

15. Wind energy turbine according to claim 14, wherein the generator (14) is a double fed asynchronous machine and wherein generating the amount of reactive current to be supplied to the grid (18) is performed by controlling at least one of the generator-side power converter (32) and the grid-side power converter (28).

16. Wind energy turbine according to claim 15, wherein, if the generator (14) is not in its operating state for generating power, the amount of reactive current to be supplied to the grid (18) is generated by controlling the grid-side power converter (28).

17. Wind energy turbine according to claim 14, wherein the generator (14',14") is an asynchronous machine and wherein generating the amount of reactive current to be supplied to the grid (18',18") is performed by controlling the grid-side power converter (28',28").

18. Wind energy turbine according to claim 14, wherein the generator (14',14") is a synchronous machine and wherein generating the amount of reactive current to be supplied to the grid (18',18") is performed by controlling the grid-side power converter (28',28").

19. Wind energy turbine according to claim 17, wherein, if the generator (14',14") is not in its operating state for generating power, the amount of reactive current to be supplied to the grid (18',18") is generated by controlling the grid-side power converter (28',28").

20. Wind energy turbine according to claim 14, wherein for generating reactive current through the frequency converter (26,26',26") the performance factor is controlled.

21. Wind energy turbine for generating power to be supplied to a grid, comprising
a rotor (12,12',12"),
a generator (14,14',14") operatively connected to the rotor (12,12',12"),
a frequency converter (26,26',26") electrically connectable to the generator (14,14',14") and the grid (18,18',18") and comprising a generator-side power converter (32, 32',32") operatively connectable to the generator (14, 14',14"), a grid-side power converter (28,28',28") operatively connectable to the grid (18,18',18"), and a DC link circuit (30,30',30") for connecting the generator-side power converter (32,32',32") to the grid-side power converter (28,28',28"), and
a control unit (38,38',38") for controlling the frequency converter (26,26',26") for generating reactive current to be supplied to the grid (18,18',18"),
wherein under normal grid condition but with the generator (14,14',14") not in its operating state, the control unit (38,38',38") controls the grid-side power converter (28, 28',28") of the frequency converter (26,26',26") for controlling an amount of reactive current to be supplied to the grid (18,18',18").

22. Wind energy turbine according to claim 21, wherein the generator (14) is an asynchronous machine, a double fed asynchronous machine, or a synchronous machine.

23. Wind energy turbine according to claim 21, wherein for controlling reactive current through the frequency converter (26,26',26"), the performance factor of the grid-side power converter (28,28',28") is controlled.

24. Wind energy turbine according to claim 14, wherein the control of the frequency converter (26,26',26") is supervised by a utility (44,44',44") or a power management control (42, 42',42") of the wind energy turbine (10,10',10") or of a wind park comprising a plurality of wind energy turbines (10,10', 10") at least one of which is operatively connected to the grid (18,18',18").

* * * * *

UNITED STATES PATENT AND TRADEMARK OFFICE
CERTIFICATE OF CORRECTION

PATENT NO. : 7,605,487 B2 Page 1 of 1
APPLICATION NO. : 10/598773
DATED : October 20, 2009
INVENTOR(S) : Barton et al.

It is certified that error appears in the above-identified patent and that said Letters Patent is hereby corrected as shown below:

In Column 7, Line 2, in Claim 3, delete "(141" and insert -- (14) --, therefor.

In Column 7, Lines 36-37, in Claim 10, after "connected to" delete "the voltage" and insert -- a --, therefor.

In Column 7, Line 59, in Claim 14, delete "(12, 12'12")," and insert -- (12, 12',12"), --, therefor.

In Column 8, Line 50, in Claim 21, delete "(18,18',18,18")," and insert -- "(18,18',18"), --, therefor.

Signed and Sealed this

Twenty-ninth Day of December, 2009

David J. Kappos
*Director of the United States Patent and Trademark Office*